United States Patent [19]

Pomero

[11] Patent Number: 5,275,436
[45] Date of Patent: Jan. 4, 1994

[54] DEVICE FOR DEFLECTING THE WHEELS OF AN AUTOMOBILE AT THE TIME OF A COLLISION

[76] Inventor: Claude Pomero, 12 Avenue Du 22 Aout 1944, 34500 Beziers, France

[21] Appl. No.: 848,025

[22] Filed: Mar. 9, 1992

[30] Foreign Application Priority Data

Mar. 7, 1991 [FR] France ................................ 91 02897

[51] Int. Cl.⁵ ...................... B62D 21/15; B60R 19/00
[52] U.S. Cl. .................................. 280/784; 280/762; 280/748; 180/232; 293/117; 296/188; 296/189
[58] Field of Search ...... 280/748, 762, 768, 770–784, 790; 180/902, 232; 293/117, 49, 50, 125, 15, 132; 296/188–189

[56] References Cited

U.S. PATENT DOCUMENTS

| | | | |
|---|---|---|---|
| 2,519,429 | 8/1950 | Brandvold | 293/49 X |
| 3,499,661 | 3/1970 | Rowe, Jr. | 280/792 X |
| 3,881,742 | 5/1975 | Felzer | 280/784 |
| 4,381,122 | 4/1983 | Kite | 293/125 |

FOREIGN PATENT DOCUMENTS

| | | | |
|---|---|---|---|
| 659143 | 3/1963 | Canada | 293/49 |
| 2223880 | 11/1973 | Fed. Rep. of Germany | 296/189 |
| 2358356 | 5/1974 | Fed. Rep. of Germany . | |
| 2208359 | 6/1974 | France . | |

Primary Examiner—Brian L. Johnson
Attorney, Agent, or Firm—Ladas & Parry

[57] ABSTRACT

A device for deflecting a tire of a motor vehicle when the tire is pushed accidentally into the device has a deflection plate for mounting fixedly on the motor vehicle. An outer face of the deflection plate is substantially vertical, faces the tire of the motor vehicle at a distance from the tire sufficient not to interfere with normal operation of the tire on the motor vehicle but effective to engage the tire when the tire is pushed accidentally and is inclined at an angle to a longitudinal vertical plane of the motor vehicle. A coating or sliding shield on the outer face of the deflection plate facilitates sliding of the tire along the incline of the outer face when the tire is pushed accidentally to engage the outer face of the deflection plate.

23 Claims, 3 Drawing Sheets

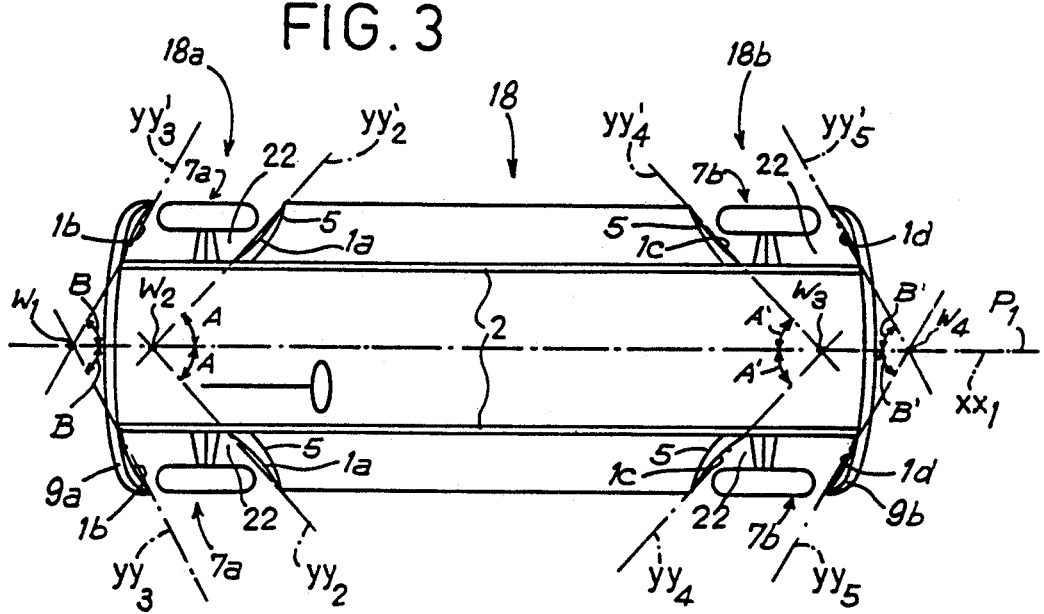
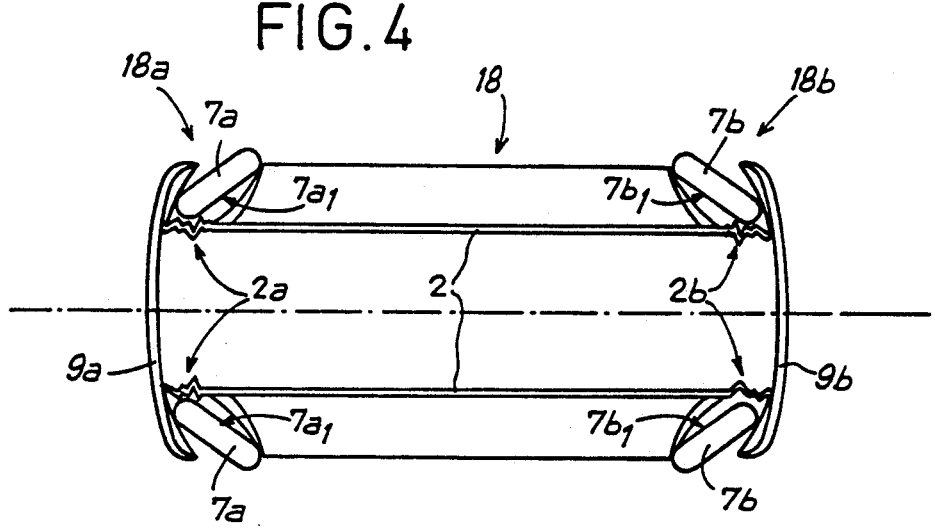

DEVICE FOR DEFLECTING THE WHEELS OF AN AUTOMOBILE AT THE TIME OF A COLLISION

BACKGROUND OF THE INVENTION

The invention is a passive safety device integrated into the body of, a vehicle to protect occupants inside the vehicle from penetration of the wheels of the vehicle into the inside of the vehicle upon a collision with another vehicle or with an obstacle. The technical field of the invention is the manufacture of automotive vehicles.

More than 50% of the occupants of automobiles who are injured or killed in highway accidents experienced frontal impacts. In each case, that is to say, the front part of the vehicle encountered an obstacle and was crushed against it. As a result, the front parts of modern vehicles are designed to deform so as to absorb the kinetic energy of such impacts.

However, the great majority of such impacts do not involve the entire front parts of the vehicles but only a portion thereof. These off-center impacts are the most dangerous since only a portion of the energy-absorbing deformable parts are involved in the collision. As a result, deformation reaches the insides of the occupant-holding front compartments of the vehicles. It is in these cases, which are the most common statistically, accounting for more than 70% of front collisions, that the wheels of the vehicles play an aggravating role in the consequences of the collisions.

The rims of the wheels, which are designed to withstand the considerable forces of normal use, are practically non-deformable and at the time of such an impact break into the inside of the vehicle where the occupants are located. This is true of the front wheels, which generally injure the lower limbs of the occupants seated in the front of the vehicle, but it is true also of the rear wheels and, when it is placed horizontally in the rear trunk or front compartment of the vehicle, the spare wheel.

The penetration of the wheels into the inside of the vehicle also weakens its rigidity, which is already relatively slight. This worsens the deformations due to the impact.

The consequences of this penetration of the wheels are rarely directly fatal but a very large number of accidents would be less serious if it could be avoided.

Automobile manufacturers, conscious of this danger, provide various solutions. For example, Renault reinforces with a bracket the path the wheels might take and Mercedes Benz protects the feet of the driver with a sort of shell of rigid foam placed in the lining of the floor to reduce the forces due to deformation of the latter.

However, these solutions are ineffective when the energy of the impact is high.

SUMMARY OF THE INVENTION

The object of the present invention is to integrate a safety device into the body of a vehicle to avoid the penetration of the wheels into the inside of the vehicle and to transform the aggressive element, which the wheels now are, into an element for protection during impact.

The object of the invention is achieved by providing a device for deflecting a wheel of a vehicle at the time of a collision. Preferably, at least one deflection plate that is substantially rigid, of large area and of metal is arranged substantially vertically in each wheel passage (i.e., wheel well) and firmly attached to the body of the vehicle (for example to a side sill of the frame). Each plate is provided on its outer face with means which favor the sliding of the tire of the wheel on the plate after an impact, the plate being close enough to the wheel for this and tilted diagonally with respect to a longitudinally vertical plane of said vehicle.

The means which favor the sliding of the tire on the plate are preferably either a rubber-sliding product applied to the outer face of said plate (more precisely a sliding product for the material constituting the main component of the tire) or by a shield arranged to slide on the outer face of the plate under the force exerted on the shield by the tire as a result of an impact and displacement of wheel. The shield may be of a material which favors sliding of the shield on the plate or, alternatively, a sliding product can be provided between the shield and plate so as to favor the sliding of the shield on the plate and, thus, favor the sliding of the tire with respect to the plate. In the latter case, the shield also protects the sliding product from dirtying and the weather.

Specific features of the invention may include:

a front deflection plate and a rear deflection plate for each of the front wheels of the vehicle;

arranging the plate at an angle to the longitudinal vertical plane of the vehicle that is between 20° and 70° and preferably between 35° and 55°;

positioning the front and rear deflection plates for a front wheel so that horizontal lines that are tangent to the plates and/or pass through respective side ends of the plates intersect the longitudinal axial vertical plane of the vehicle at points in front, i.e. forward, of the respective plates;

positioning front and rear deflection plates for a rear wheel so that lines that are tangent to the plates and/or pass through respective side ends of the plates intersect the longitudinal axial vertical plane of the vehicle at points to the rear of the respective plates;

a vertical or horizontal section of the plate in the form of a straight line or a curved shape such as a circular arc, ellipse, parabola, hyperbole, "S" or clothoid;

a sliding product for the rubber of the tire that causes a coefficient of static friction between the rubber and the plate of less than 0.3, preferably less than 0.2, and more preferably less than 0.1;

a sliding product selected from among polytetrafluorethylene, a greasy or oily product, or a product having a base of graphite or silicone resin;

a shield that closely follows the shape of the outer face of the plate in front (i.e., on the wheel-facing side) of the plate with a sliding product applied between the shield and the plate, the shield being fastened not very strongly to the plate by fastening means the break on impact and, more precisely, break on the impact of the wheel on the shield; and a shield that closely follows the shape of the outer face of said plate and consists primarily of a material having a coefficient of static friction with the plate sufficiently low (for example, less than or equal to 0.3) to slide on the plate on impact.

The device achieves the object of the invention when placed in a wheel passage (or in the receptacle for the spare wheel) close to the wheel and diagonally to its path during impact. This places it in the position of a shield, that is to say, inclined crosswise, to divert and, thus, protect the inside of the car from the possible intrusion of the wheel or another metal part it pushes.

In accordance with a first embodiment, an automotive vehicle has at least one plate in each of the tire passages, i.e. the well regions between the wheels and the inside of the car. The attachment of each plate to the frame of the vehicle must be such that any of the wheels that is pushed violently at the time of the impact is deflected diagonally by the creation of a moment of rotation with respect to, preferably, a vertical axis passing through the center of the wheel and the plane of the wheel. For the front steering wheels, this movement is easy since a mechanical system, the pivot intended f or steering the wheel in curves, already permits this rotation. For the rear wheels and the spare wheel, the impact must be more violent to twist the axle when the wheel comes against the deflection plate.

It is therefore seen that the fundamental property of the device is to create, at the time of impact, this movement of rotation of the wheel around a preferably vertically axis in the case of the wheels fastened on the axles and around a horizontal axis in the case of the spare wheel. For this, the plate is placed, for instance, substantially vertically in the case of the wheels on axles at an angle to the longitudinal axial vertical plane of the vertical of between 20° and 70°, and preferably between 35° and 55°. The orientation of this angle is such that a horizontal line tangent to either of the plates placed near the front wheels will go towards the front of the vehicle as it approaches the longitudinal axial vertical plane of the vehicle, and will go towards the rear as it approaches the same plane if the line is tangent to either of the plates placed near the rear wheels. This orientation is intended to push the wheels that are pushed by the impact against the plates back towards the outside of the vehicle whether the impact is from the front or rear.

The deflection plate is preferably provided with a sliding coating such that the coefficient of static friction of the rubber on the plate becomes less than 0.3, preferably less than 0.2, and more preferably less that 0.1. This means to favor sliding is necessary since rubber has a very high coefficient of friction with most materials that could block, i.e. bind, the tire on the device despite the inclined bias of the latter, at least until the incline is particularly pronounced, that is, exceeds about 60°. Under these conditions, however, the space taken up by the plates becomes too substantial.

Few sliding products are effective with rubber. One may cite, in particular, graphite, polytetrafluorethylene, certain silicone resins, molybdenum disulfide, and greasy and oily products. For this reason, it may be of interest, as a variant, to replace said sliding product with a solid surface shield. The material selected for the shield slides easily on the plate, that is to say, the coefficient of friction with the plate is less than or equal to 0.3. If this shield is fastened on the plate by attachments which can break easily, it will then lead to the deflecting of the tire on the plate.

In either case, the plate need not necessarily be flat. It may have a cross section, in a horizontal plane and in a vertical plane, that is in the shape of a known curve, for instance a circular arc, ellipse, parabola, hyperbole, "S", clothoid or, more generally, any shape which permits the deflection of the wheel pushed by the impact towards the outside without blocking (binding).

In accordance with a second preferred embodiment, an automotive vehicle has at least one preferably metallic plate in a wheel passage (well) between a front wheel and the front bumper. The inclination described above is retained; it is the same as in the already-described vehicle equipped with two deflector plates per wheel that are substantially parallel, substantially vertical and diagonal. In this second embodiment, therefore, it is the front part of the fender that impacts on the wheel via the sliding diagonal plate and forces the wheel to pivot around its vertical axis. The wheel being then swung, continuation of the crushing due to the impact would then flatten the wheel against the inside of the vehicle crosswise, which will contribute to protecting the inside of the vehicle since the wheel will then serve as protective shield.

The use of one or two plates per wheel in accordance with the invention leads to the deflection of the wheel at the time of the impact and therefore, reduces the risk of injuries due to the penetration of the rim into the inside of the vehicle; furthermore, the wheel, which is then placed crosswise, improves the protection of the passengers.

In accordance with another particular embodiment, an automotive vehicle that has a horizontal spare tire and wheel receptacle, generally obtained by the deforming of a plate at the bottom of the trunk, is equipped with deflection device, i.e. a plate covered with a sliding coating. The plate of the deflection device is placed in an oblique plane with respect to the axial plane of the tire. The wheel being placed substantially horizontally in its receptacle, it is important that the oblique plane be perpendicular to the axial longitudinal vertical plane of the vehicle and that its trace on this plane forms an angle on the order of 45° with the horizontal.

If the plate is placed at the rear of the receptacle, that is to say, on the rear bumper side, this angle will open towards the front of the vehicle, extending downward with respect to the horizontal. If the plate is placed between the inside of the vehicle and the receptacle, this angle will open towards the front of the vehicle, extending upward. In both cases therefore, the inside of the vehicle will flare out in the region of the plate about 45°. It is preferable to place the plate in the longitudinal axis of the vehicle between the receptacle and the rear bumper. Upon a rear impact, the wheel, compressed by the inclined sliding plate, will lift off at this point and come against the front part of the receptacle. It will, therefore, place itself in a position as a protective shield between the striking vehicle and the inside of the car. In the case of a plate placed between the inside of the car and the receptacle, the wheel will be lifted at the front but it has less chance of placing itself in the position of a protective shield if the trunk, for instance, is filled.

The reasoning is the same if the receptacle for the spare wheel is in the front compartment. It still will be preferable to place the plate between the bumper and the receptacle of the spare wheel.

BRIEF DESCRIPTION OF THE DRAWING

The following description refers to the accompanying drawings which show, without limitation, embodiments of vehicles in accordance with the invention.

FIGS. 3 and 4 are diagrammatic plan views of a vehicle 18 in two situations, namely before and after a double collision at the front and rear.

DESCRIPTION OF DRAWN EMBODIMENTS

Figure 1:
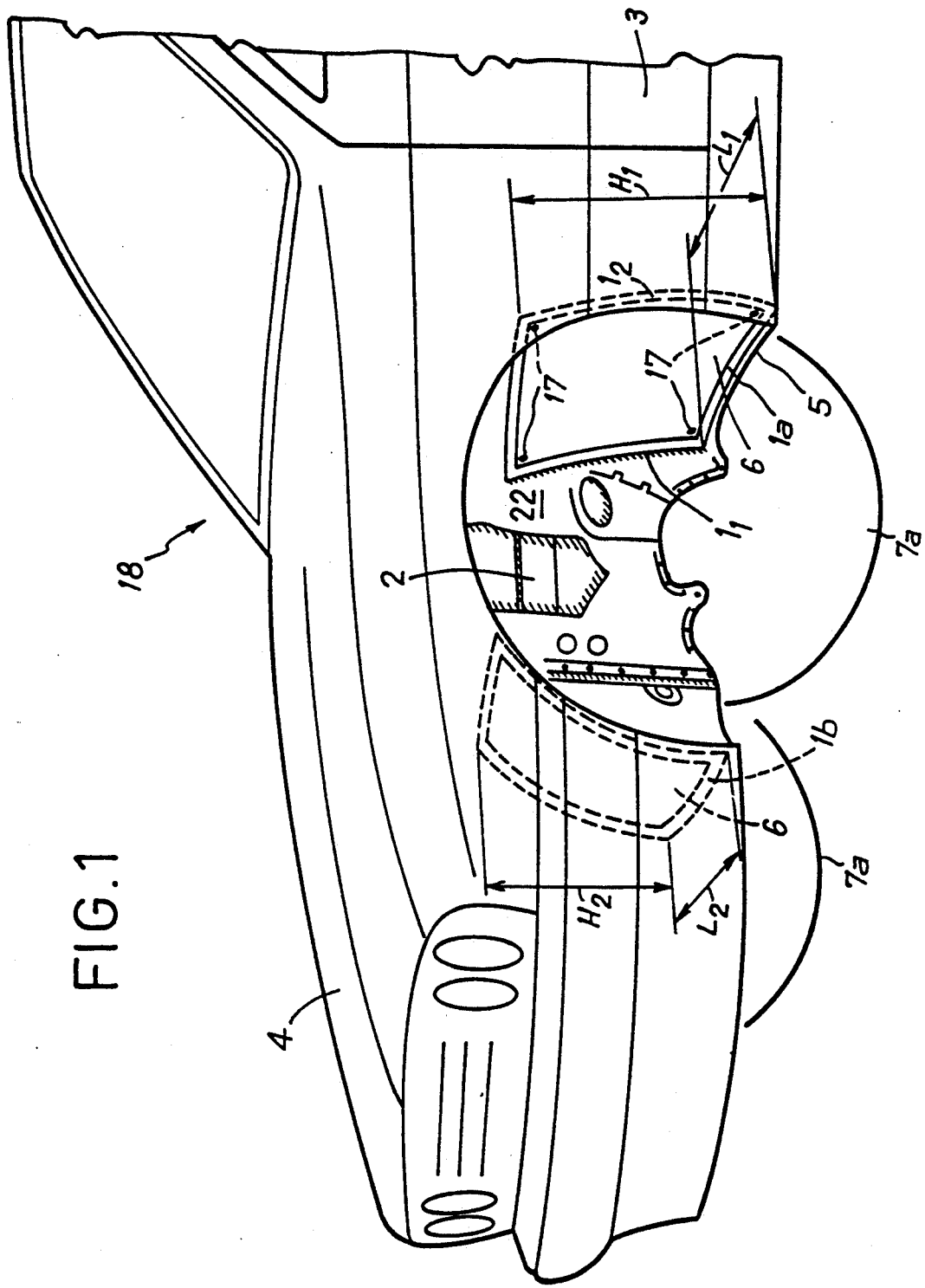
FIG. 1 is a partial perspective front/top/left side view of an automobile body in accordance with an embodiment the invention, but without wheel or mechanical parts in order that the embodiment can be clearly noted.

FIG. 1 shows the body of a vehicle 18 equipped with devices in accordance with the invention, but without wheels or mechanical parts (the front wheels 7a being merely suggested by partial circles).

The body has a first, rear deflection plate 1a at the left-front wheel 7a. This plate is steel of a thickness of 3 mm, placed substantially vertically and welded on a first side along a lateral edge $1_1$ onto the side of wheel passage or well 22, that rests on the side sill 2, which is sort of metal beam firmly attached to the passenger compartment 3 of the vehicle to extend longitudinally therefrom between the engine compartment 4 and the wheel. The plate is welded on the other side along an opposite side edge $1_2$ onto the partition 5 that separates the passenger compartment from the engine compartment.

Plate 1a is covered by a second, shield plate 6, which is of metal, thermoplastic or of any other suitable material for forming a shield. This shield 6 can be of such a nature that it slides easily on said deflection plate 1a or else a sliding product such as graphite, grease, polytetrafluorethylene, molybdenum disulfide or silicone resin can be placed between the two plates 1a and 6.

In another embodiment (not shown), the said shield 6 can be eliminated and only a tire-sliding product then on the plate 1a.

At the time of a front impact, the crushing of the fenders causes the wheel to rest against the plate 1a whether provided with the plate 6 or tire-sliding product. The resulting sliding on the plate 1a, which is arranged diagonally, then swings the wheel.

A front plate 1b has also been shown.

Figure 2:
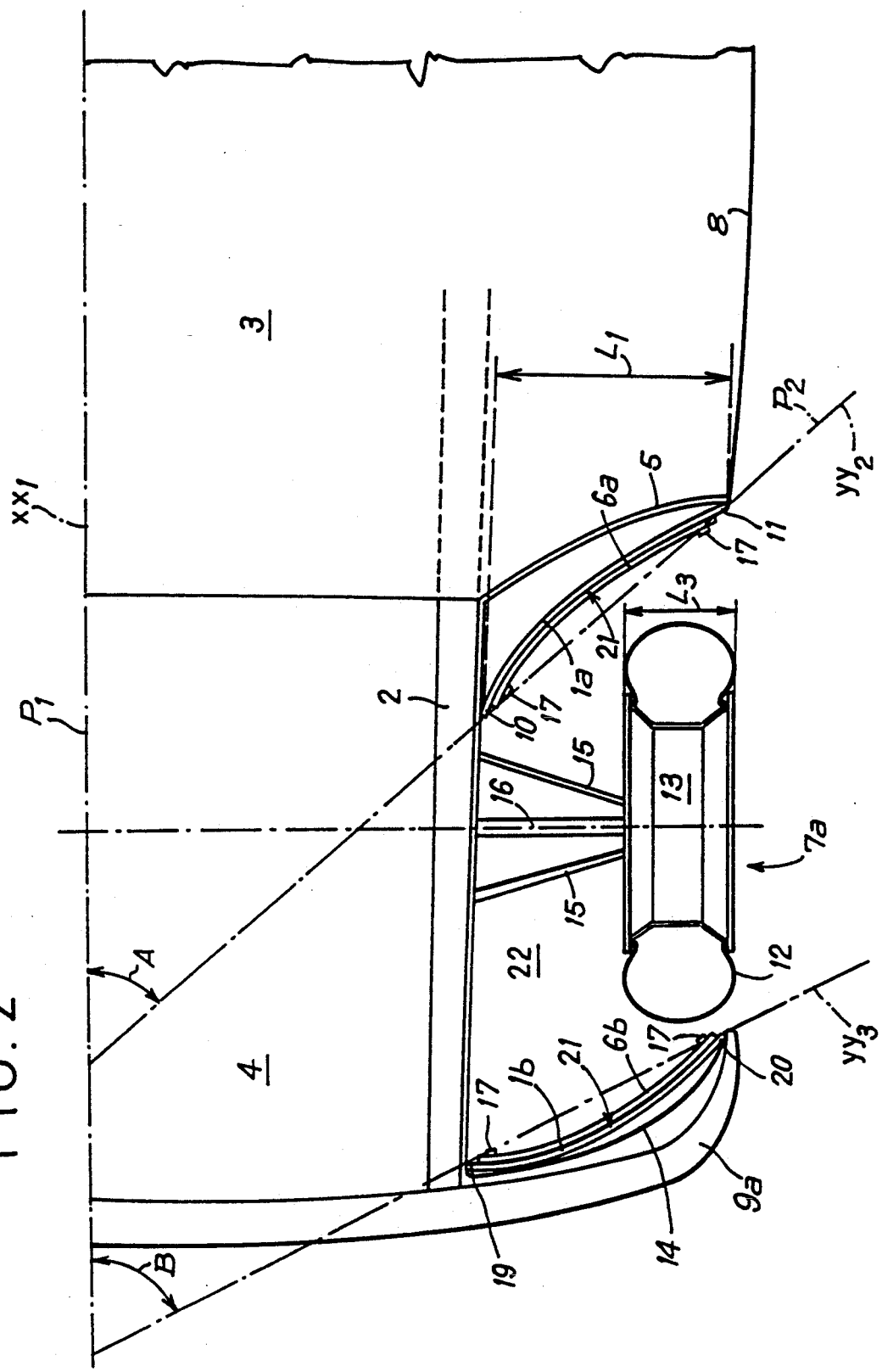
FIG. 2 is a horizontal partial semisection of FIG. 1, at the height of the axis of the wheels.

The rear deflection plate 1a and front deflection plate 1b (as well as, preferably, the shields 6 with which they are provided) are advantageously of substantial height ($H_1$ and $H_2$ respectively), for instance at least equal to half the height (diameter) of the wheel, and also of substantial width ($L_1$ and $L_2$ respectively), for instance at least equal to the width of the wheel ($L_3$ in FIG. 2).

In the event that the said device comprises the said shield 6, the latter is preferably fastened by fastening means of the "mechanical fusible" (frangeable) type, that is to say, capable of breaking under the effect of the pressure exerted by said wheel on the device. The shield then slides on the outer face 21 (FIG. 2) of the deflection plate, which thus plays its role as a deflector.

A plate or plates can in the same way be placed between the rear wheel and the inside of the vehicle for the same functional purpose as the plates 1a and 1b, but in order to deflect the rear wheel upon rear impact of the vehicle (as illustrated in FIGS. 3 and 4).

FIG. 2 is a partial diagrammatic semisection of the front of a vehicle along a horizontal plane passing through the axis of the four wheels. A wheel 7a comprises a rim 13 and a tire 12. The rim is connected to a drive (or universal) shaft 16 and is held by suspension arms 15. The latter have been shown in order that the invention may be better understood, only the tire being in section.

The plate 1a is shown slightly concave and oriented by an angle A close to about 45° with respect to the longitudinal axis $xx_1$ of the vehicle (which corresponds to the trace of a vertical longitudinal plane of said vehicle in the plane of FIG. 1).

It is seen that the wheel 7a necessarily comes against the plate 1a and shield 6a in the event an impact causes the wheel to be pushed towards the wall 5 of the passenger compartment 3.

It is seen that the said plate 1a is fastened on the one hand close to the angle (the intersection) which said wall 5 of the passenger compartment makes with the side walls 8 of the vehicle and, on the other hand, on the side sill 2. Said plate 1b and shield 6b are also fastened on said side sill 2 on the one side but on a front plate 14 of the wheel passage close to the bumpers 9a on the other side.

It is therefore the crushing of the bumper, followed by that of the wheel passage, which causes said plates 1a and 1b to come against the wheel so as to cause it to pivot, whereby the wheel does not penetrate into the passenger compartment. This is shown in FIG. 4.

Referring to FIG. 2, it is seen that, in the same way as the rear deflection plate 1a for the front wheel 7a, the front deflection plate 14 for the front wheel is slightly concave and oriented by an angle B close to about 45° with respect to said longitudinal axis $xx_1$ of said vehicle.

In the example shown in FIG. 2, it is seen that an horizontal axis $yy_3$, located in the plane of FIG. 2 and passing through the side ends 19 and 20 of said plate 1b, forms said angle B with the trace $xx_1$, in the plane of FIG. 2, of said longitudinal vertical plane $P_1$ of said vehicle.

It is also seen that, in this embodiment, shields 6a and 6b are respectively provided. They are mounted by fastening means 17 of the mechanical fusible type on the outer faces 21 of said deflection plates 1a and 1b, respectively.

In FIGS. 3 and 4, the vehicle 18 is provided in its front part 18a with a front bumper 9a and its rear part 18b with a rear bumper 9b.

In the structure of the body of the vehicle, the side sills 2 are substantially longitudinal and can be substantially parallel to the horizontal longitudinal axis $xx_1$ in the longitudinal vertical plane P1 of said vehicle.

Referring to FIG. 3, it is seen that each of said wheel passages 22 for the front wheels 7a and the rear wheels 7b of the vehicle is equipped with front and rear deflection plates 1b, 1a for the front wheels 7a and 1c, 1d for the rear wheels.

It is seen in FIG. 3 that a horizontal axis $yy_2$ passing through the side ends (i.e., side edges) of the rear deflection plate 1a of the left front wheel 7a encounters the plane P1 at the point W2 that is common to the intersection of a corresponding axis $yy'_2$ of the right rear deflection plate 1a of the right front wheel 7A. Both form angles A with said plane P1 and/or said axis $xx_1$.

In the same way, an axis $yy_3$ passing through the side ends of the left front plate 1b encounters said plane P1 at the point W1 that is common to the intersection of a corresponding axis $yy'_3$ of the right front deflection plate 1b of the right front wheel. Both form angles B with said plane P1 and/or said axis $xx_1$.

In accordance with a characteristic of the invention, said points W2 and W1 are located in front of said plates 1a and 1b, respectively, so as, in case of a collision that deforms the front part 18a of the vehicle as indicated in FIG. 4, to force the pivoting of the front wheels 7a by sliding them on the outer faces of the deflection plates 1a and 1b provided in each of the front wheel passages 22.

In this way it is seen that—as illustrated in FIG. 4—after the collision, which has for instance caused a deformation of the said side sills in zones 2a of less resistance of said sills and has thus caused the shortening of them, the right and left front wheels 7a are pivoted such that their inner faces $7A_1$ are directed towards the rear of the vehicle. The situation shown in FIG. 4 thus corresponds to a situation in which the collisions has taken place substantially along the axis of the vehicle.

Referring again to FIG. 3, it is seen that, on the other hand, with respect to the deflection plates 1c, 1d located in the wheel passages of the rear wheels 7b, the axes $yy_4$ and $yy_5$ through the side ends of the plates 1c and 1d, respectively, intersect said plane P1 and/or said axis $xx_1$ at common points W3 and W4 and angles B and B', respectively, that correspond to the points of intersection W1 and W2 and angles A and A' for the front wheels, except that points W3 and W4 are located to the rear of the front and rear deflection plates 1c and 1d, respectively. In the event of a collision, as illustrated in FIG. 4, the inner faces $7B_1$ of the rear wheels 7B are, therefore, directed towards the front of the vehicle as a result of the pivoting of the wheels around a substantially vertical axis from the deformation of the rear part 2d of said side sills 2.

I claim:

1. A device for deflecting a wheel of an automotive vehicle, comprising at least one deflection plate means for firmly attaching to an automotive vehicle sufficiently near to a wheel of said vehicle for engagement by said wheel only upon impact against said vehicle, said deflection plate means comprising a deflection plate of a large area arranged substantially vertically and diagonally with respect to a longitudinal vertical plane of said vehicle, and tire-sliding means on an outer face of said deflection plate for sliding said wheel along said deflection plate upon said engagement.

2. The device according to claim 1, wherein said defection plate means is for firmly attaching to said vehicle near a front wheel of said vehicle.

3. The device according to claim 1, wherein a section of said deflection plate has a curved shape.

4. The device according to claim 2, wherein a section of said deflection plate has a curved shape.

5. The device according to claim 1, wherein said tire-sliding means comprises a sliding coating covering said outer face of said deflection plate, said sliding coating consisting of a sliding product for rubber which causes a coefficient of static friction between rubber and said deflection plate that is less than 0.3.

6. The device according to claim 1, wherein said tire-sliding means comprises a sliding product selected from the group consisting of polytetrafluorethylene, a greasy product, an oily product, a product having a base of graphite, and a produce having a base of silicone resin.

7. The device according to claim 1, wherein said tire-sliding means comprises a plate-like shield that closely follows a shape of said outer face of said deflection plate and covers said outer face of said deflection plate, a sliding product between said shield and said deflection plate, and for attaching said shield to said deflection plate, fastening means capable of breaking under said impact and engagement of said wheel on said defection plate.

8. The device according to claim 1, wherein said tire-sliding means comprises a plate-like shield that closely follows a shape of said outer face of said deflection plate, said shield being on and covering said outer face of said deflection plate and formed primarily of a material having a coefficient of static friction with said deflection plate below 0.3.

9. The device according to claim 2, wherein said tire-sliding means comprises a sliding coating covering said outer face of said deflection plate, said sliding coating consisting of a sliding product for rubber which causes coefficient of static friction between rubber and said deflection plate that is less than 0.3.

10. The device according to claim 2, wherein said tire-sliding means comprises a sliding product selected from the group consisting of polytetrafluorethylene, a greasy product, an oily product, a product having a base of graphite, and a product having a base of silicone resin.

11. The device according to claim 3, wherein said tire-sliding means comprises a sliding coating covering said outer face of said deflection plate, said sliding coating consisting of a sliding product for rubber which causes a coefficient of static friction between rubber and said deflection plate that is less than 0.3.

12. The device according to claim 3, wherein said tire-sliding means comprises a sliding product selected from the group consisting of polytetrafluorethylene, a greasy product, an oily product, a product having a base of graphite, and a product having a base of silicone resin.

13. The device according to claim 4, wherein said tire-sliding means comprises a sliding coating covering said outer face of said deflection plate, said sliding coating consisting of a sliding product for rubber which causes a coefficient of static friction between rubber and said deflection plate that is less than 0.3.

14. The device according to claim 4, wherein said tire-sliding means comprises a sliding product selected from the group consisting of polytetrafluorethylene, a greasy product, an oily product, a product having a base of graphite, and a product having a base of silicone resin.

15. A device for deflecting wheels of an automotive vehicle, comprising at least one deflection plate firmly attached to a frame of an automotive vehicle in each passage for a wheel of said vehicle, each deflection plate being arranged substantially vertically and diagonally with respect to a longitudinal vertical plane of said vehicle at an angle with said longitudinal vertical plane of between 20 and 70 degrees, and tire-sliding means covering an outer face of said deflection plate for sliding said wheel along said deflection plate upon impact-produced engagement therebetween, wherein a height of each said deflection plate is at least equal to half a height of said wheels and wherein a width of each said deflection plate is at least equal to a width of said wheels.

16. The device according to claim 15, wherein each said deflection plate is firmly attached to said frame of said vehicle in front of said wheels.

17. The device according to claim 15, wherein said tire-sliding means comprises a sliding coating covering said outer face of said deflection plate, said sliding coating consisting of a sliding product for rubber which causes a coefficient of static friction between rubber and said deflection plate that is less than 0.3.

18. The device according to claim 15, wherein said tire-sliding means comprises a sliding product selected from the group consisting of polytetrafluorethylene, a greasy product, an oily product, a product having a base of graphite, and a product having a base of silicone resin.

19. The device according to claim 15, wherein said tire-sliding means comprises a sliding coating covering said outer face of said deflection plate, said sliding coating consisting of a sliding product for rubber which causes a coefficient of static friction between rubber and said deflection plate that is less than 0.3.

20. The device according to claim 16, wherein said tire-sliding means comprises a sliding product selected from the group consisting of polytetrafluorethylene, a greasy product, an oily product, a product having a base of graphite, and a product having a base of silicone resin.

21. A device for deflecting wheels of an automotive vehicle, comprising at least one deflection plate firmly attached to a frame of an automotive vehicle in each passage for a wheel of said vehicle, each deflection plate being arranged substantially vertically and diagonally with respect to a longitudinal vertical plane of said vehicle at an angle with said longitudinal vertical plane of between 35 and 55 degrees, and tire-sliding means on an outer face of said deflection plate for sliding said wheel along said defection plate upon impact-produced engagement therebetween, wherein a height of each said deflection plate is at least equal to half a height of said wheels and wherein a width of each said deflection plate is at least equal to a width of said wheels.

22. The device according to claim 21, wherein each said deflection plate is firmly attached to said frame of said vehicle in front of said wheels.

23. A device for deflecting a tire of a motor vehicle when the tire is pushed accidentally into the device, the device comprising:
a deflection plate for mounting fixedly on a motor vehicle with an outer face of the deflection plate substantially vertical facing a tire of the motor vehicle at a distance from the tire sufficient not to interfere with normal operation of the tire on the motor vehicle but effective to engage the tire when the tire is pushed accidentally and inclined at an angle to a longitudinal vertical plane of the motor vehicle; and
tire-sliding means on the outer face of the defection plate for facilitating sliding of the tire along the incline of the outer face when the tire is pushed accidentally to engage the outer face of the deflection plate.

* * * * *